Patented Apr. 10, 1951

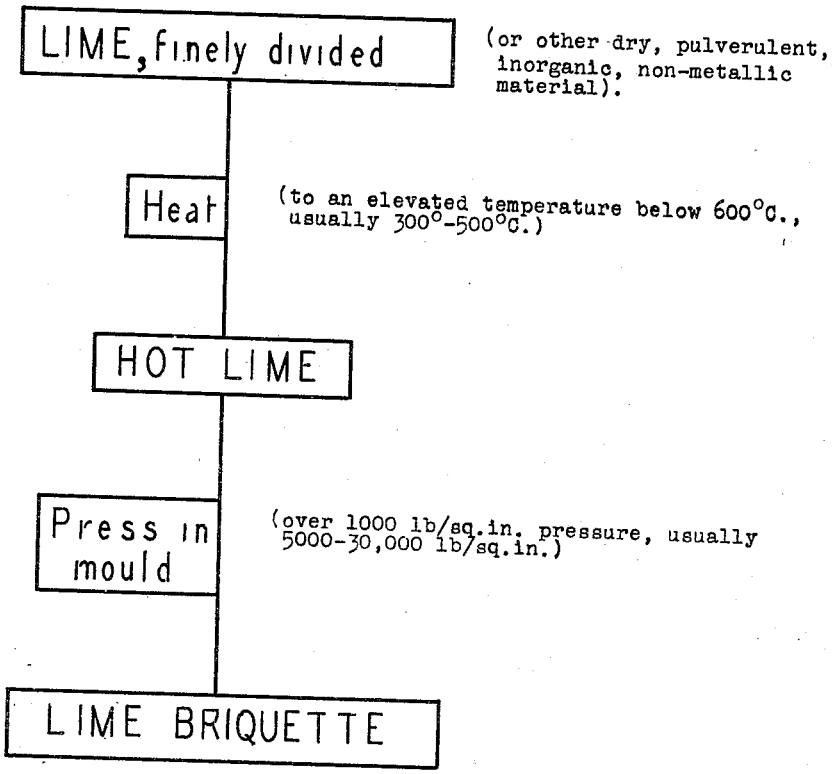

2,548,212

UNITED STATES PATENT OFFICE 2,548,212

PROCESS OF BRIQUETTING AND PRODUCT THEREOF

John H. Gibbs and Arthur H. Andersen, Shawinigan Falls, Quebec, Canada, and Albert J. Abbott, St. Louis, Mich., assignors to Shawinigan Chemicals Limited, Montreal, Quebec, Canada, a corporation of Canada Application November 5, 1948, Serial No. 58,614
In Great Britain November 19, 1947

17 Claims. (Cl. 25—156)

This invention relates to the moulding under pressure of certain finely divided materials, without binders, but under particular conditions, whereby the mouldings produced have mechanical strength superior to that of ordinary mouldings of the finely divided materials moulded without binder. The invention is of special interest in relation to briquets of commercial size but is not restricted thereto.

It is the principal object of this invention to provide a process whereby certain finely divided materials may be moulded under pressure, to form mouldings having mechanical strength superior to that of ordinary mouldings of the finely divided material. It is another object of this invention to provide a process whereby mixtures of certain finely divided materials may be moulded, under pressure, to form mouldings having mechanical strength superior to that of ordinary mouldings of the mixtures. It is a particular object of this invention to provide a process whereby lime and mixtures of lime with other materials may be pressed into briquets having mechanical strength superior to that of ordinary briquets of lime or lime mixed with other material.

Briquets of most pulverulent materials are relatively weak in impact strength and/or low in abrasion resistance unless excessive, impractical, briquetting pressures are used or unless binders are added to the materials prior to their being briquetted. With the aid of binders of various types, it is possible to make briquets of a wide variety of materials at reasonable briquetting pressures. However, the use of binders is sometimes prohibited by the necessity for non-contamination of the material of which the briquet is to be made. Further, the additional cost of the binder is sometimes prohibitive and always objectionable.

It has been discovered that briquets of numerous pulverulent non-metallic inorganic materials, having superior mechanical properties, can be made by carrying out the pressing operation with the materials at elevated temperatures. This advantage cannot be achieved with all materials to an equal extent.

The fact that a large number of non-metallic inorganic free-flowing pulverulent materials of very high melting point (i. e. not below about 1200° C.) are mouldable at temperatures for below their normal melting points has apparently not been generally recognized. It has been found that such materials, when in a finely divided or powdery form and heated to the temperature range at which they exhibit mouldable properties, can be pressed into briquets that have far greater mechanical strength than briquets made of the same materials at normal room temperature at which the materials do not exhibit mouldable properties. It has also been found that when such materials are mixed, in finely divided form, with other materials, also in finely divided form, the mixtures can be moulded and pressed, at an elevated temperature, into mouldings that have far greater mechanical strength than mouldings made of the same mixtures pressed at normal room temperatures.

The briquetting of coal at elevated temperatures is well known, the purpose of the elevated temperature during the pressing operation being to develop the plasticity of the coal and/or to evolve tarry substances to act as binder. Coal is not one of the pulverulent materials referred to in this specification, since binding material is inherent in heated coal.

In the art of powder metallurgy, it has become a common practice to heat and press metal powders simultaneously, causing welding or fusion of the particles. Particle fusion occurs without the use of excessively high pressures since, as is well known, metals undergo plastic deformation under stress at elevated temperatures.

As far as is known, materials other than the above have always been briquetted at whatever temperature the materials happened to have, depending on their previous environments during processing, storage, or transportation. Perhaps the only exception occurred when a binder which required elevated temperature to melt or soften was used as an addendum in a briquetting process.

The present invention consists of a process for briquetting finely divided, pulverulent, non-metallic, inorganic materials that exhibit the property of being mouldable at elevated temperatures, the process being characterized in that the material is heated to an elevated temperature and the pressing operation is carried out without the addition of binding material while the material being briquetted is at the elevated temperature. The invention includes the process as outlined above and as applied to mixtures of the above-mentioned materials and to mixtures of the above-mentioned materials with other materials which, by themselves, are unsuitable for the process of this invention. More particularly the invention consists of a process for the production of briquets having improved mechanical properties obtained by briquetting pulverulent non-metallic inorganic materials at temperatures much below the fusing or melting point of the materials but elevated above normal briquetting temperatures by about 100° to 500° C. In particular, the invention comprises the briquetting, at temperatures in the range from about 300° C. to about 500° C. and at pressures in the range from about 5,000 lb./sq. in. to about 30,000 lb./sq. in., of pulverulent non-metallic inorganic materials and mixtures that exhibit the property of being mouldable at the briquetting temperature, including the following, inter alia:

Dried and pulverized limestone
C. P. calcium carbonate (precipitated)
Lime (calcined C. P. $CaCO_3$)
Lime (calcined limestone)
Lime (calcined C. P. $Ca(OH)_2$)
Lime hydrate (acetylene dry generator residue)
Lime (calcined lime hydrate) (acetylene dry generator residue)
Magnesia
Calcined dolomite and ferrosilicon (used in Pidgeon process for magnesium)
Zinc oxide
Zinc oxide and coke (5:1 by weight, as used in producing zinc)
Zinc oxide and ferric hydroxide (acetone process catalyst)
Calcium carbide dust
Pulverized coke and lime (calcined from lime hydrate)

The following examples are given to illustrate, but not to limit, the scope of the invention.

*Example 1*

Lime dust (through 100 mesh) from calcined commercial limestock was briquetted at room temperature and at a pressure of 15,000 lb./sq. in. in a cylindrical mould of one inch diameter giving a briquet one inch high. Similar briquets were made by the same method and from the same lime, but with the lime and the mould maintained at about 500° C. Groups of each type of briquet were tested as described below with these results:

|  | Impact Strength | Abrasion Resistance |
| --- | --- | --- |
| Pressed at room temperature | 3.2 | 67 |
| Pressed at 500° C | 15.6 | 82 |

It is readily seen that briquetting this material at an elevated temperature has resulted in an almost five-fold increase, in resistance to impact, over the resistance to impact of the same material briquetted at room temperature. There has also been a decrease of over 45% in the amount of dust produced in the abrasion test of briquets of this material with the briquets being pressed at an elevated temperature. These outstanding improvements in the mechanical properties of briquets are entirely unexpected, and not predictable from the ordinary properties or normal behaviour of the material from which the briquets were made. For example in U. S. P. 2,017,558, it was pointed out that extremely high pressure or the use of a binding agent was necessary to form shaped bodies of ordinary lime such as is obtained from burnt limestone.

*Example 2*

The procedure of Example 1 was repeated with fine dust (through 65 mesh) from commercial calcium carbide with these results:

|  | Impact Strength | Abrasion Resistance |
| --- | --- | --- |
| Pressed at room temperature | 5 | 29 |
| Pressed at 350° C | 20 | 97 |

The results show that, for calcium carbide briquets, a four-fold increase in resistance to impact and a 95% decrease in the amount of dust produced in the abrasion test can be obtained by briquetting the material at an elevated temperature instead of at room temperature.

*Example 3*

Powdery lime, made by calcining the lime hydrate residue of an acetylene dry generator at 650° C. in an electric muffle, was briquetted at room temperature and at a pressure of 30,000 lb./sq. in. in a cylindrical mould 0.84 inch in diameter giving a briquet one inch high. Similar briquets were made by the same method and from the same lime, but with the lime and the mould maintained at about 400° C. Groups of each type of briquet were tested as described below with these results:

|  | Impact Strength | Abrasion Resistance |
| --- | --- | --- |
| Pressed at room temperature | 5 | 87 |
| Pressed at 400° C | 19 | 98 |

The results show that briquetting this material at 400° C. instead of at room temperature results in a four-fold increase in the resistance to impact of the briquets, and an 85% decrease in the amount of dust produced in the abrasion test.

*Example 4*

The procedure of Example 3 was repeated with dry lime hydrate powder obtained from acetylene dry generator residue. The results of the tests on the briquets were as follows:

|  | Impact Strength | Abrasion Resistance |
| --- | --- | --- |
| Pressed at room temperature | 12 | 97 |
| Pressed at 400° C | 33 | 98 |

The results show that an almost three-fold increase in resistance to impact for lime hydrate briquets can be obtained by briquetting at 400° C. instead of at room temperature, while the abrasion resistance, already satisfactorily high, is not adversely affected.

The materials and mixtures listed earlier in the specification have all been found to form briquets having superior mechanical properties when they are pressed at elevated temperatures. In the case of pulverized limestone (−100 mesh), the impact strength of briquets pressed at 500° C. has been found to be more than double that of briquets pressed at 20° C., while more than a ten-fold increase in impact strength of briquets of C. P. precipitated calcium carbonate was found on pressing the material at 500° C. instead of room temperature. In the case of the calcined dolomite-ferrosilicon mixture, and the zinc oxide-coke mixture, the increase in impact strength of briquets pressed at 350° C. over briquets pressed at 20° C. was more than fourfold. In the case of the coke-lime mixture, compared with the impact strength of a briquet pressed at 20° C., the impact strength of a briquet pressed at 350° C. was doubled and, of a briquet pressed at 500° C., was tripled.

The briquetting temperatures used in these pressing operations are far below the melting or sintering temperatures of these pulverulent materials. No explanation for the remarkable improvement in mechanical properties can be offered; obviously any powdered material will form a strong briquet if pressed at a temperature close to its melting point, since mechanical abrasion between particles will cause some fusion, but the pulverulent materials referred to in this specification cannot be briquetted at such high temperatures because available briquetting machinery cannot operate at temperatures above about 60° C.

Numerous other pulverulent materials and mixtures may beneficially be briquetted according to the method described herein, while briquets of some materials and mixtures benefit only slightly or not at all. For example, hematite and mixtures of hematite with coke and lime, such as are used in smelting, form weak briquets when pressed at room temperature, and form briquets with impact strength up to 300% greater when pressed at 350° C. Rock phosphate and mixtures of rock phosphate with mineral asbestos tailings, can be pressed at 350° C. into briquets having 25-50% greater impact strength than similar briquets pressed at 20° C.

It will be seen that the present invention comprehends the briquetting, by compression at elevated temperatures, of a non-metallic inorganic material or materials which do not appreciably soften or melt at the temperature of compression. Preferably temperatures above 100° C., suitably above 200° C. and most suitably above 300° C. are employed. The pressure employed in compression preferably exceeds 1,000 lb./sq. in. being suitably above 5,000 lb./sq. in. and is most suitably above 10,000 lb./sq. in. By the present invention we are able to produce strong briquets from, for example, metal oxides or metal carbides, alone or in admixture with metals or carbon without the use of an added binder.

The test methods used to determine the relative mechanical strengths of briquets as referred to in this specification are carried out as follows:

*Impact strength.*—The sample under test is set on a stationary anvil and a small weight of about 50 grams is set on it. Above this is arranged a second weight of 140 grams arranged to slide freely on a vertical guide. The second weight is raised a short distance and allowed to fall, giving an impact blow through the first weight to the sample. The test is repeated at successively greater distances of fall of the weight until the sample cracks. The last distance (in inches) is recorded as the "impact strength."

This test is a measure of the ability of the briquets to withstand the tumbling incidental to falling to or from conveyor belts or chutes or into storage bins, without breaking.

*Abrasion resistance.*—Two standard eight inch screens (0.525 inch and 0.065 inch openings, respectively) with a cover and a bottom pan, are fitted on a "Combs' Gyratory Riddle." Four to six briquets are placed in the top screen and the riddle is operated for thirty minutes. The weight of material remaining on the top screen, expressed as a percentage of the original weight of the briquets, is called the "abrasion resistance." The second screen distinguishes between dusting to fine powder and breakage to coarse lumps; the latter does not occur with briquets of the type discussed in this specification.

This test is a measure of the ability of the briquets to withstand abrasion incidental to moving on conveyor belts or chutes or into storage bins, without dusting.

We claim:

1. A process for briquetting finely divided pulverulent non-metallic inorganic material having a melting point of at least 1200° C., comprising heating the material to an elevated temperature between about 100° C. and about 600° C., and briquetting the material while it is at the elevated temperature without the addition of binding material.

2. A process as claimed in claim 1, in which the material is a mixture of (1) a finely divided pulverulent non-metallic inorganic material that exhibits the property of being mouldable at elevated temperatures and (2) other finely divided pulverulent non-metallic inorganic material.

3. A process, as claimed in claim 2, in which the mixture comprises a metal oxide and coke.

4. A process, as claimed in claim 3, in which the material is heated to an elevated temperature between 300° C. and 500° C.

5. A process according to claim 4 in which the material is briquetted at a pressure in the range from 5,000 lb./sq. in. to 30,000 lb./sq. in.

6. A process for briquetting finely divided pulverulent non-metallic inorganic material having a melting point of at least 1200° C. and that exhibits the property of being mouldable at elevated temperature below 600° C., comprising heating the material to an elevated temperature between about 100° C. and about 600° C., and briquetting the material while it is at the elevated temperature without the addition of binding material.

7. A process, as claimed in claim 6, in which the material is a mixture of finely divided pulverulent non-metallic inorganic substances that exhibit the property of being mouldable at elevated temperatures.

8. A process, as claimed in claim 7, in which the mixture consists of a metal oxide and a metal hydroxide.

9. A process according to claim 8, in which the material is heated to an elevated temperature between 300° C. and 500° C.

10. A process, according to claim 9, in which the material is briquetted at a pressure in the range from 5,000 lb./sq. in. to 30,000 lb./sq. in.

11. A process according to claim 6, in which the material is calcium carbide.

12. A process, according to claim 6, in which the material is lime.

13. A process, according to claim 6, in which the material is lime hydrate.

14. A process for briquetting finely divided lime comprising heating the lime to an elevated temperature between about 100° C. and about 600°

C., and briquetting the lime while it is at the elevated temperature without the addition of binding material.

15. A process as claimed in claim 14, in which the lime is heated to a temperature in the range between 300° C. and 500° C.

16. A briquette of finely divided non-metallic inorganic material having a melting point of at least 1200° C., prepared by the process claimed in claim 1.

17. A lime briquette, prepared by the process claimed in claim 14.

JOHN H. GIBBS.
A. H. ANDERSEN.
ALBERT J. ABBOTT.

REFERENCES CITED

The following references are of record in the file of this patent:

UNITED STATES PATENTS

| Number | Name | Date |
| --- | --- | --- |
| 1,944,709 | Friedersdorff | Jan. 23, 1934 |
| 1,951,133 | De Bats | Sept. 14, 1934 |
| 2,091,569 | Ridgway et al. | Aug. 31, 1937 |
| 2,122,960 | Schwartzwalder | July 5, 1938 |
| 2,131,374 | Grunwald | Sept. 27, 1938 |
| 2,303,244 | Wedlock | Nov. 24, 1942 |

FOREIGN PATENTS

| Number | Country | Date |
| --- | --- | --- |
| 27,619 | Great Britain | Jan. 4, 1908 |